2,751,507
AUTOMATIC CIRCUIT BREAKER SYSTEM

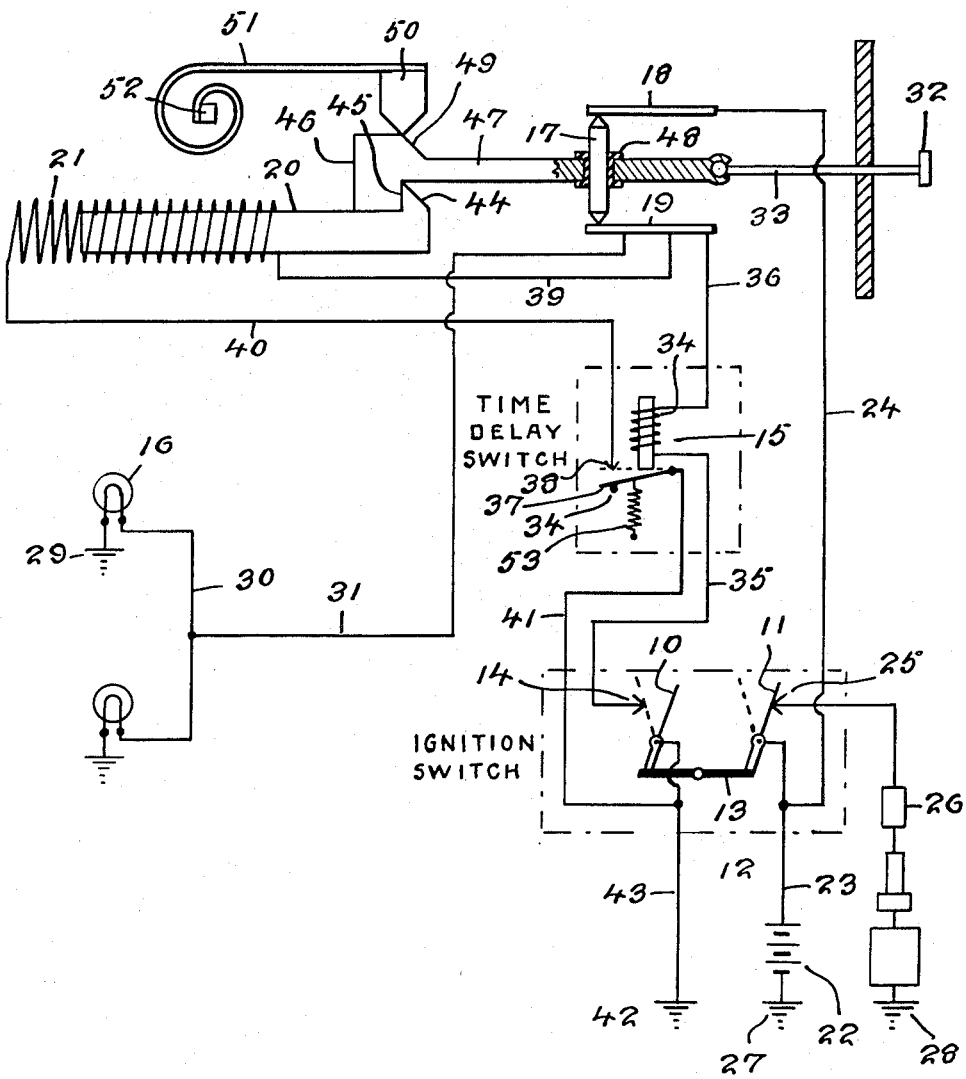

Paul C. Crum, Chicago, Ill.

Application February 25, 1953, Serial No. 338,677

3 Claims. (Cl. 307—10)

This invention relates to an auxiliary switch positioned in an electric circuit and having a time delay relay in combination with the switch whereby lights, appliances, or other electrical devices are automatically turned off after a predetermined period of time.

The purpose of this invention is, primarily, to prevent running down automobile batteries, however, the device may be incorporated in various other types of electrical circuits where the possibility of circuits being accidently turned on or neglected unnecessarily uses electricity.

In numerous instances, even though the ignition switch of a motor vehicle is turned off, the lights, radio, heater, or other appliance or device in a motor vehicle may have an electric circuit completed thereto and in such instances batteries are run down or unnecessary electricity is used. With this thought in mind this invention contemplates a time delay relay incorporated in an electrical circuit wherein the circuit is turned off or broken after a predetermined period of time from the time a main switch of the circuit is turned off.

The object of this invention is, therefore, to provide automatically operating means in an electric circuit for breaking a circuit to lights, appliances and the like after turning off a main switch of a circuit.

Another object of the invention is to provide means for automatically breaking a circuit after a predetermined time interval from the time the main switch of the circuit is turned off in which the device is adapted to be incorporated in circuits now in use.

A further object of the invention is to provide a safety unit adapted to be installed in an electric circuit for breaking the circuit when the circuit is unintentionally turned on in which the unit is of a simple and economical construction.

With these and other objects and advantages in view the invention embodies an auxiliary contact positioned in and connected to operate with the ignition switch, particularly of a motor vehicle, with a circuit extended from the auxiliary contact to a time delay switch and solenoid wherein a switch connected in a main circuit of a vehicle or the like is opened by the solenoid after a predetermined period of time from the time the ignition switch is turned off.

The single figure of the drawing shows a system and switch for accomplishing these objects.

Referring now to the drawing wherein like reference characters denote corresponding parts the improved automatic switch of this invention includes a switch arm 10 connected to a conventional arm 11 of an ignition switch 12 with a bar 13 whereby upon turning off the ignition switch the arm 10 engages a contact 14, a time delay relay 15 connected in the circuit of the auxiliary switch, lights 16 and a contact bar 17 positioned to engage contacts 18 and 19 and which is actuated by a core 20 forming part of a solenoid 21.

The ignition switch 12 is connected to a battery or other source of current supply as indicated by the numeral 22 with the wire 23 and the contact 18 is connected to the wire 23 with a wire 24. The contact arm 11 to which the wire 23 is connected is positioned to engage a contact 25 of the ignition system 26 of the vehicle.

The ignition switch 12 is turned to the position shown in the drawing in full lines when it is desired to operate the vehicle whereby current is supplied from the battery 22 through the arm 11 of the switch to the ignition system 26, the opposite terminal of the battery 22 being grounded as shown at the point 27 and the ignition system being grounded as shown at the point 28.

The lights 16 of the vehicle are grounded as shown at the point 29 and with the lights connected by wires 30 and 31 to the contact 19 a circuit to the lights is completed from the battery 22 through wires 23 and 24 to the contact 18, through the arm 17 to the contact 19 and from the contact 19 through the wires 30 and 31 to the lights, the opposite terminals of which are grounded.

Although lights only are illustrated in the drawing it will be understood that other devices or electrical appliances may be connected through suitable circuits to the switch formed by the bar 17 and contacts 18 and 19 which, for the purpose of illustration, is the light switch of the vehicle. With the ignition switch turned off or the circuit therethrough broken the circuit to the lights 16 remains completed until the button 32 on the stem 33 is pushed in to carry the contact bar 17 beyond the ends of the contacts 18 and 19. The circuit to the lights or other parts of the vehicle may, therefore, remain completed after the ignition switch is turned off.

This invention contemplates incorporating a time delay relay 15 in the circuit to the lights or other parts of the vehicle and, as shown in the drawing the contact 14 of the auxiliary switch incorporated in the ignition switch is connected to the coil 34 of the time delay relay with a wire 35 and the opposite terminal of the coil is connected by a wire 36 to the contact 19.

Upon turning the key of the ignition switch whereby the arms 10 and 11 move from the position shown in full lines to the position shown in dotted lines a circuit is completed from the battery 22 through the wires 23 and 24, contacts 18 and 19, and bar 17 to the lights 16, through the wires 31 and 30; and at the same time, from the contact 19 through the wire 36 to the coil 34 of the relay 15, and from the coil through the wire 35 to the bar 10 which is connected to a ground 42 through the wire 43.

After a predetermined period of time the relay 15 operates to move the armature 37 to engage the contact 38 whereby a circuit is completed from the contact 19 through the wire 39 to the coil 21 and from the opposite end of the coil to the ground through the wire 40, armature 37 and wires 41 and 43.

As the solenoid 21 is energized the core 20 is drawn into the solenoid whereby a projection 44 at the end of the core engages a shoulder 45 of a lug 46 at the end of the light switch bar 47 whereby the contact arm 17 is drawn from the contacts 18 and 19 thereby breaking the circuit to the lights or other appliances. The bar 17 is insulated from the bar 47 by an insulating bushing 48.

The bar 17 is also provided with an inclined shoulder 49 that is positioned to engage a dog 50 that is urged by a spring 51 against the inclined surface 49 whereby the switch bar 47 is resiliently held in the inner position wherein the circuit to the lights is broken. The spring 51 is mounted on a cross bar 52 that may be supported by suitable means.

The time delay relay arm 37 is provided with a spring 53 which immediately draws the arm against a stop 54 when the circuit to the solenoid 34 is broken.

It will be understood, therefore, that a switch, similar to the switch formed with the members 17, 18 and 19 may be incorporated in circuits to different appliances or other parts of a motor vehicle and should switches to these circuits be overlooked the current passing through the circuits actuates the time delay relay switch to open the circuits.

Although the device is described as adapted to open circuits accidentally left on it can also be used to turn off circuits used for different purposes after a predetermined period of time, such as should an operator of a motor vehicle desire the lights of his car to remain on until he reaches the door of his residence.

The time delay relay may be thermal, motor-driven, pneumatic, or of any other suitable type.

It will be understood that modifications, within the scope of the appended claims, may be made in the design and arrangement of the parts without departing from the spirit of the invention.

What is claimed is:

1. In an electrical control circuit, the combination which comprises an electrically operated device, a source of current, a main circuit connecting said electrically operated device to said source of current, spaced contacts connected in said main circuit, a stem having a button on an extended end positioned between the spaced contacts, a contact bar carried by and insulated from said stem, said stem being positioned whereby the contact bar is adapted to bridge the spaced contacts of the main circuit, said stem having a lug on the end opposite to that on which the button is positioned and said lug having a shoulder on one side and an inclined surface on another side, a solenoid positioned with the axis in a plane parallel to the axis of said stem, said solenoid having a core and said core having a projection positioned to engage the shoulder of the stem whereby upon energizing the solenoid the projection of the core thereof actuates the stem whereby the contact bar of the stem is separated from said spaced contacts opening the main circuit, a dog carried by a spring and positioned to contact the inclined surface of the lug of the stem for retaining the stem with the contact bar thereof spaced from the contacts, an auxiliary circuit connected to opposite terminals of the solenoid and to contact terminals of said main circuit whereby current thereto is supplied by the main circuit, and a time delay relay in said auxiliary circuit whereby the solenoid actuates the contact bar after a predetermined time interval to open a circuit to said electrically operated device.

2. In an electrical control circuit, the combination which comprises an electrically operated device, a source of current, a main circuit connecting said electrically operated device to said source of current, spaced contacts connected in said main circuit, a contact bar adapted to be manually actuated positioned to bridge said spaced contacts, a solenoid having a core, means for operatively connecting the core of the solenoid to the means for bridging the spaced contacts whereby upon energizing the solenoid the bridging means is separated from said spaced contacts, an auxiliary circuit connected to opposite terminals of the solenoid and to contact terminals of said main circuit whereby current thereto is supplied by the main circuit, and a time delay relay in said auxiliary circuit whereby the solenoid actuates the bridging means after a predetermined time interval to open a circuit to said electrically operated device.

3. In a motor vehicle light control circuit, the combination which comprises a light, a source of current, a main circuit connecting said light to said source of current, spaced contacts connected in said main circuit, a stem having a button on an extended end and a contact bar for bridging the spaced contacts of the main circuit thereon, a solenoid having a core, means for operatively connecting the core of the solenoid to the stem whereby upon energizing the solenoid the contact bar of the stem is separated from said spaced contacts, an auxiliary circuit connected to opposite terminals of the solenoid and to contact terminals of said main circuit whereby current thereto is supplied by the main circuit, and a time delay relay in said auxiliary circuit whereby the solenoid actuates the contact bar through said stem after a predetermined time interval to open a circuit to said light.

References Cited in the file of this patent

UNITED STATES PATENTS

| | | |
|---|---|---|
| 1,348,746 | Schepeler | Aug. 3, 1920 |
| 1,826,477 | Olpp | Oct. 6, 1931 |